United States Patent
Dubay et al.

[19]

[11] Patent Number: 5,916,600
[45] Date of Patent: Jun. 29, 1999

[54] MOLD ASSEMBLY FOR HOLDING A SHEET OF GLASS DURING MOLDING

[75] Inventors: Steven Charles Dubay, Rockford; Thomas Keith Langejans; Robert Edward Bloomfield, both of Holland; Daniel Robert Athey, New Zeeland; William Keith Boezwinkle, Grand Haven; Mark Allan Craycraft, Holland, all of Mich.

[73] Assignee: Donnelly Corporation, Holland, Mich.

[21] Appl. No.: 08/709,126

[22] Filed: Sep. 6, 1996

[51] Int. Cl.$^6$ .................................................. B29C 45/14
[52] U.S. Cl. .......................... 425/116; 264/252; 425/127; 425/129.1
[58] Field of Search ..................................... 425/116, 127, 425/129.1; 264/252

[56] References Cited

U.S. PATENT DOCUMENTS

| | | | |
|---|---|---|---|
| 2,137,472 | 11/1938 | Forbes | 425/116 |
| 2,304,984 | 12/1942 | Wood | 264/275 |
| 2,655,692 | 10/1953 | Fay | 249/91 |
| 2,736,067 | 2/1956 | Boschi | 264/261 |
| 4,561,625 | 12/1985 | Weaver | 425/116 |
| 4,584,155 | 4/1986 | Zanella | 264/252 |
| 4,626,185 | 12/1986 | Monnet | 425/116 |
| 4,662,113 | 5/1987 | Weaver | 425/542 |
| 4,688,752 | 8/1987 | Barteck et al. | 425/116 |
| 4,732,553 | 3/1988 | Hofer | 425/116 |

(List continued on next page.)

FOREIGN PATENT DOCUMENTS

| | | |
|---|---|---|
| 081671 | 6/1983 | European Pat. Off. . |
| 57-158481 | 9/1982 | Japan . |
| 60-196317 | 10/1985 | Japan . |
| 2-182424 | 7/1990 | Japan .................. 425/116 |
| 6-94145 | 11/1994 | Japan . |
| 451507 | 8/1936 | United Kingdom . |
| 695257 | 8/1953 | United Kingdom . |
| 2141375 | 12/1984 | United Kingdom . |
| 2115049 | 3/1986 | United Kingdom . |

OTHER PUBLICATIONS

Two sheets of drawings (A & B) showing a mold assembly used by the Assignee of the present invention to manufacture window assemblies which were sold by that Assignee more than one year prior to the filing date to the present application.

*Primary Examiner*—Robert Davis
*Attorney, Agent, or Firm*—Van Dyke, Gardner, Linn & Burkhart, LLP

[57] ABSTRACT

A high pressure mold assembly and method for holding a sheet of material such as glass while molding a gasket or other molded portion on the sheet from a thermoplastic or other moldable material such as PVC at high pressures of at least 2000 psi. The assembly and method provides an improved holding feature which reduces the percentage of broken sheets of material and yet controls the flash or overflow of the moldable material out of the mold cavity. The mold assembly includes a first mold section and a second mold section. The first mold section includes a first seal receiving surface which receives a first resilient seal while the second mold section has a second seal receiving surface which receives a second resilient seal. The seals engage and hold the sheet therebetween and accommodate variations in the sheet. Each of the seals is adapted to press and seal against the sheet for preventing the flow of the molten material along the sheet while under high pressure of between about 2,000 psi and 5,000 psi. The seals are each protected from the high pressure by a shoulder spacing the seal from the mold cavity. The shoulder is spaced from the sheet by a small gap preferably within the range of between about 0.007 and 0.013 inches. The method includes providing a high pressure injection mold assembly, the mold assembly having first and second mold sections and first and second resilient seals as described above. The sheet of material is held between the seals to avoid breakage and accommodate variations while the seals are protected by positioning them adjacent shoulders which prevent seal blow-out. Preferably, the seals are formed from urethane, polyethylene terephthalate or silicone rubber.

45 Claims, 11 Drawing Sheets

U.S. PATENT DOCUMENTS

| | | | |
|---|---|---|---|
| 4,761,916 | 8/1988 | Sanok et al. | 49/381 |
| 4,762,481 | 8/1988 | Weaver | 425/116 |
| 4,792,425 | 12/1988 | Weaver | 264/252 |
| 4,830,804 | 5/1989 | Weaver | 264/139 |
| 4,834,931 | 5/1989 | Weaver | 264/252 |
| 4,839,122 | 6/1989 | Weaver | 425/129.1 |
| 4,854,599 | 8/1989 | Barteck | 425/116 |
| 4,915,395 | 4/1990 | Barteck | 425/116 |
| 5,061,429 | 10/1991 | Yoshihara et al. | 425/116 |
| 5,108,687 | 4/1992 | Jourquin et al. | 425/116 |
| 5,158,638 | 10/1992 | Osanami et al. | 264/252 |
| 5,454,706 | 10/1995 | Midorikawa et al. | 425/116 |
| 5,464,575 | 11/1995 | Jaffiol et al. | 425/116 |
| 5,665,397 | 9/1997 | Fisher et al. | 425/116 |

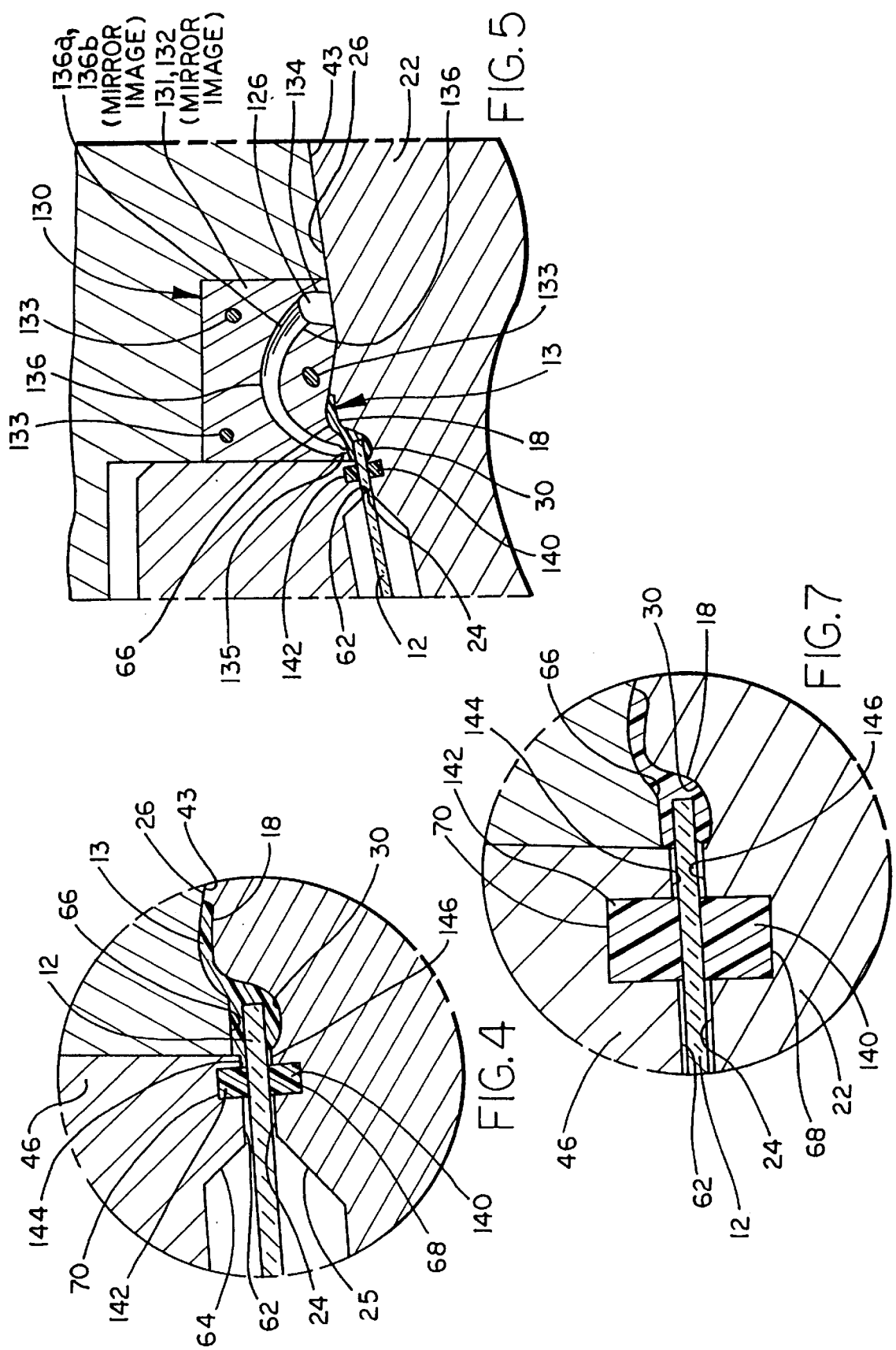

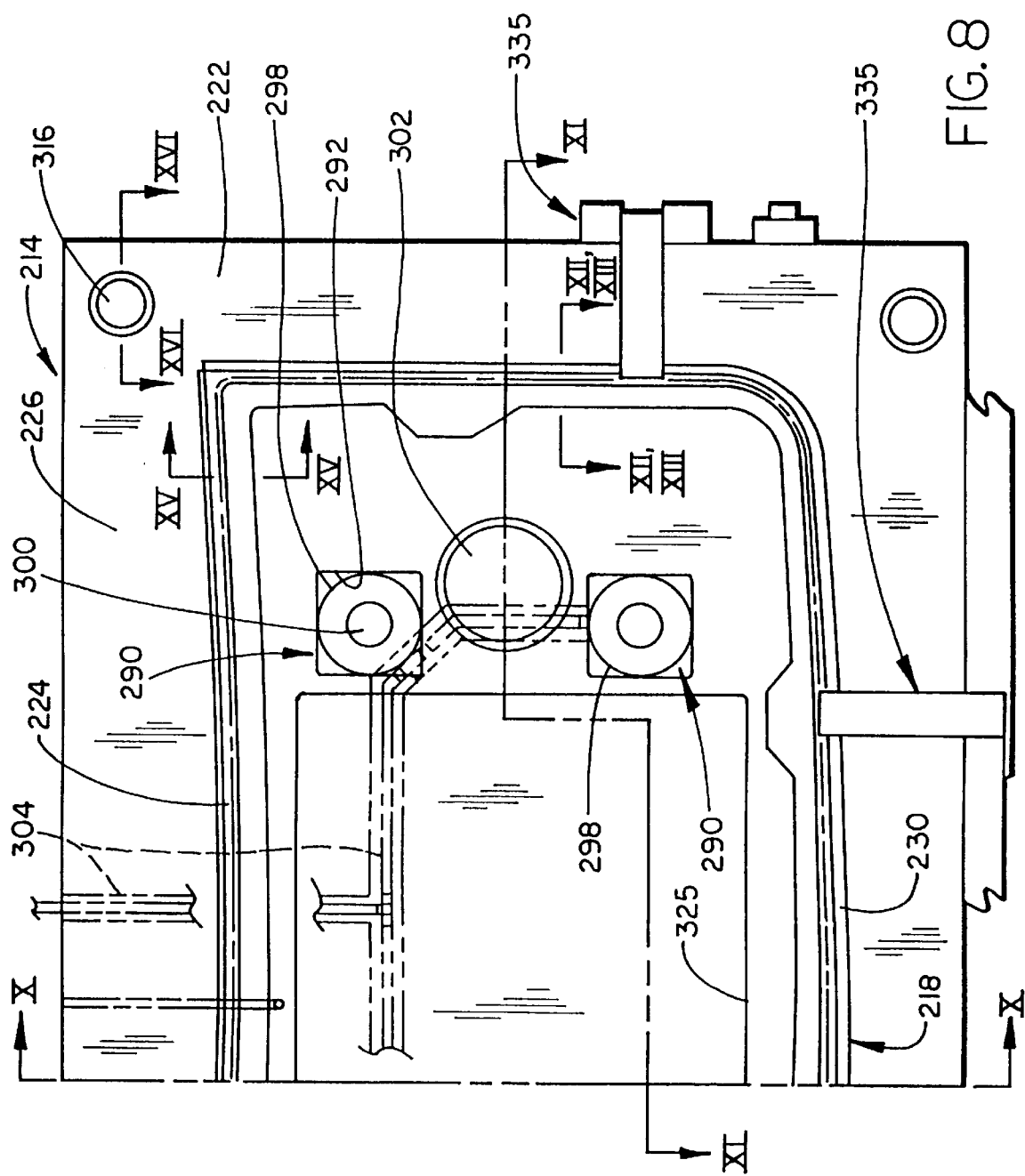

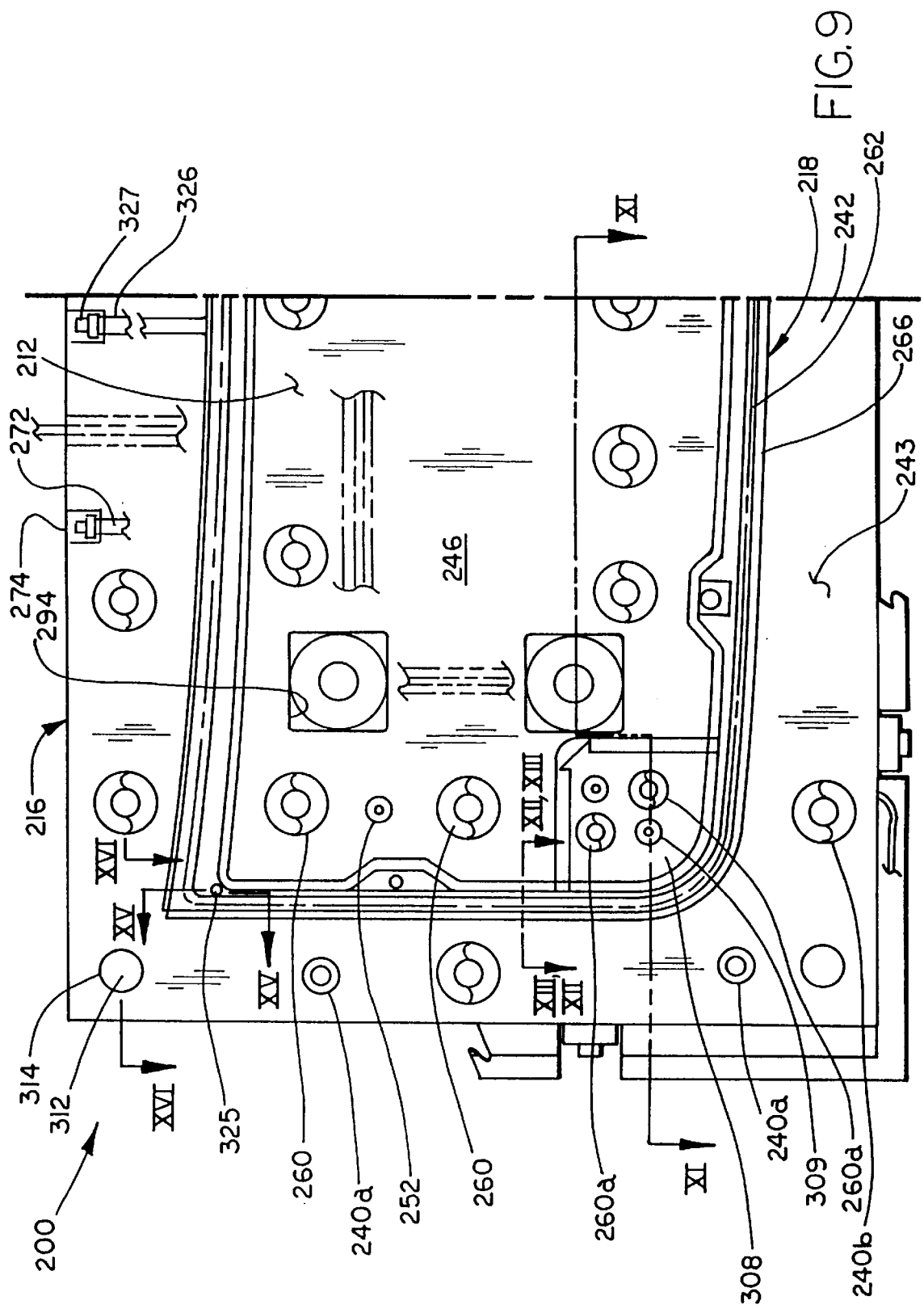

MOLD ASSEMBLY FOR HOLDING A SHEET OF GLASS DURING MOLDING

TECHNICAL FIELD AND BACKGROUND OF THE INVENTION

This invention relates to mold structures and methods for holding a sheet of material during molding and, more particularly, to mold structures and methods for holding a sheet of material during molding of a gasket or casing on the sheet of material, such as glass, to form modular window assemblies for vehicles, architectural applications, and the like.

In recent years the manufacturing of automobiles and other vehicles has included the use of light weight, strong modular window assemblies which are made and installed as a single unit from the outside of a vehicle. Much less labor is required for such installation than has been previously known. Examples of this type of modular window assembly are shown in U.S. Pat. Nos. 4,072,340 and 4,139,234. Generally, these assemblies include a sheet of glass and a peripheral casing or gasket of molded polymeric material which extends around at least portions of the periphery of the glass. In some cases, an integral frame is embedded within the casing or gasket. In other cases, an outer frame or bezel is secured to the gasket or casing with integral portions of the bezel molded into the casing. In yet other cases, the casing or gasket is simply molded from material such as polyvinyl chloride (PVC) or reaction injection molded polyurethane and the entire assembly is secured to the vehicle by strong adhesives and/or fasteners molded into and protruding from the gasket and/or attached to the glass itself.

The production of such modular window assemblies requires the combination of a sheet of glass and a polymeric gasket. The glass is configured to cover the shape of an opening in a vehicle, such as a windshield opening, a back light opening, or a side view opening as well as being curved to the contour of the overall vehicle body shape. The gasket or casing must be formed and adhered to a portion of the glass such as its periphery to not only properly seal the window around the vehicle body opening but also to provide appropriate trim or body filling portions to meet required appearance standards. The gasket or casing is typically applied to the periphery or another portion of the glass sheet by reaction injection molding or PVC molding.

In reaction injection molding (RIM), two agents are injected into the mold cavity of a molding apparatus. The agents combine in a chemical reaction to form a thermosetting, resinous urethane material. Since RIM is a chemical reaction molded process, the pressure required for the process is low- on the order of 50 psi.

In PVC molding, the PVC is melted and then injected into the mold cavity of the mold assembly. The molten PVC is typically injected under pressures ranging from 2,000 psi to 5,000 psi. The cycle time of the PVC molding process is much faster that RIM and entails lower material costs than reaction injection molding, as the cost of PVC is lower than the cost of the agents required in RIM. Moreover unlike RIM, the PVC is thermoplastic and recyclable and, therefore, scraps from the molding process may be reheated and reused again in another cycle, thereby helping to reduce overall material costs.

One significant problem frequently encountered in both such methods of manufacture is the breakage of glass when the mold sections used to make such assemblies are closed. Glass sheets which are curved, shaped, and contoured include a relatively wide range of permissible piece to piece variation in their contour. Consequently, when rigid mold sections are closed around a sheet having a greater variation in contour than the mold permits, such sheet may be bent beyond its fracture point or be broken, chipped, damaged, or otherwise made unsuitable for use. This is especially true for more highly contoured glass sheets in recently developed aerodynamically styled vehicles in the United States and elsewhere. In PVC molding, the percentage of glass breakage is typically greater than for RIM. In conventional PVC molding, the shut off surfaces for the PVC, which close the mold cavity along and around the glass sheet, comprise rigid steel surfaces, which are conventionally required in order to resist the high pressures associated with the PVC molding process. Because these surfaces are rigid, they cannot adequately accommodate the degree of tolerance variations exhibited in highly contoured windows. Moreover, with the high pressures associated with the PVC molding process, the holding force of the mold sections is significantly greater than for RIM. The combined effect is to have a greater percentage of glass breakage in PVC molding than in RIM.

A second major problem encountered in the manufacture of such modular window assemblies, is the overflow or flashing of polymeric or other flowable molding material out of the desired mold cavity at the peripheral edge of the glass sheet either onto the viewing areas of the glass or away from the gasket or casing position. Overflow or flashing can be reduced by increasing the holding pressure on the sheet. However, this will have the adverse effect of increasing the percentage of breakage. This unsightly "flash" or mold overflow requires manual trimming with knives or razor blades after molding. Extensive trimming raises the cost of such assemblies or requires scrapping such parts if the overflow or flash is extensive.

In reaction injection molding (RIM), resilient seals are often provided to stop the flash of the sealant material. These seals are typically located at the distal edge of the mold assemblies and abut the mold cavity provided for the seal material. Heretofore, these seals have been unavailable for use in PVC molding, because the seals cannot withstand the high pressure associated with the PVC molding process. If use was attempted in PVC molding, the seals typically ruptured or released an uncontrolled amount of gasket material onto the viewing the surface of the glass. In the extreme case, the seals are blown out and the glass sheet breaks.

Accordingly, there is a need for a high pressure mold assembly and method for holding a sheet of glass during a molding process with PVC, other thermoplastic or resinous materials, or other materials molded under high pressure that will accommodate sheets of glass with a greater range of dimensional variations and will significantly reduce the breakage of the sheets during the molding process, while maintaining or controlling the amount of flash or overflow of the flowable PVC or other moldable material onto the sheet of glass.

SUMMARY OF THE INVENTION

The present invention provides a high pressure mold structure or assembly as well as a molding method in which a gasket or casing is formed from flowable molding material, including thermoplastic materials, such as PVC, or resinous materials, around at least portions of the periphery or other areas of a sheet of material, such glass, without damaging or breaking the sheet material, which reduces overflow or flash on the undesired areas of the sheet material or viewing areas of the glass or in the gasket itself, and which provides a greater degree of flexibility and accommodation for variations in the glass dimensions and shape.

In one form, the invention is a high pressure mold assembly for forming a molded gasket or casing on a portion of a sheet of material including first and second cooperating mold sections having facing surfaces, which define a mold cavity therebetween. A first of the mold sections defines a first seal receiving surface for receiving a first seal, which supports a sheet of material in the mold assembly. The first seal presses the sheet against the facing surface of the second mold section with sufficient force for holding and suspending the sheet between the first and second mold sections while a molded gasket is molded on the sheet portion with a molten material introduced into the mold cavity under high pressure exceeding about 2000 psi. In one aspect, the second mold section includes a second seal receiving surface for receiving a second seal. Each of the first seal receiving and the second seal receiving surfaces includes a groove formed therein in which the first and second seals are positioned for engaging and holding the sheet therebetween and for absorbing variations in the sheet. Each seal is adapted to press and seal against the sheet for preventing the flow of the molten material therepast along the sheet when the molten material is injected under high pressure.

In another aspect, a shoulder is provided between the mold cavity and each of the grooves to protect the seals from the high pressure during molding. In other aspects, each of the shoulders include a generally planar surface for facing the sheet of material. The planar surfaces extend generally parallel to a first surface and a second surface of the sheet of material and define a first gap between the first mold section and the first surface of the sheet and a second gap between the second mold section and second surface of the sheet. These gaps are preferably small to protect the seals against the high pressure.

In further aspects, each of the seals includes a generally planar surface for facing the sheet of material, the planar surfaces of the seals extending generally parallel to the first and second surfaces of the sheet of glass. In yet other aspects, each of the seals include an axis of symmetry. The axis of symmetry extends generally perpendicular to the respective first and second surfaces of the sheet of material. The seals are selected from the material in the group consisting of urethane, polyethylene terephthalate (PET), and silicone rubber.

According to another aspect of the invention, a high pressure mold assembly for molding a moldable material injected under high pressure on a portion of a glass sheet, includes first and second mold sections having facing surfaces, which define a mold cavity therebetween. The first mold section defines a first seal receiving surface for receiving a first seal for holding the glass sheet. The second mold section includes a movable pad supported thereon, the movable pad having a second seal receiving surface opposing the first seal receiving surface of the first mold section and at least one resilient member urging the movable pad toward the first mold section. A pair of seals are provided, one seal positioned in each of the first seal receiving surface and the second seal receiving surface for engaging and holding the glass sheet therebetween while absorbing variations in the glass. The seals are adapted to press and seal against the glass sheet for preventing flashing of the moldable material past the seals when introduced into the mold cavity at a high pressure of at least about 2,000 psi.

In another aspect, the movable pad includes a shoulder, which is interposed between the seal on the second seal receiving surface and the mold cavity for protecting the seal on the second seal receiving surface from the high pressure associated with the injection of the moldable material into the mold cavity. In other aspects, each of the first and second seal receiving surfaces includes a generally planar surface intermediate the seals and the mold cavity for facing the glass sheet. The planar surfaces extend generally parallel to a first contact surface and a second opposed contact surface of the glass sheet. The planar surfaces define a first gap between the first seal receiving surface and the first contact surface of the glass sheet and a second gap between the second seal receiving surface and the second contact surface of the glass sheet. Preferably, the first gap is in the range of 0.007 inches to 0.015 inches. While the second gap is in the same range or within the range of approximately 0.001 inches to 0.003 inches, depending on the seal material which is used. In other aspects, the seals may project from the first and second seal receiving surfaces a distance within the range of approximately 0.005 inches to 0.01 inches.

According to yet another aspect of the invention, a method of holding a sheet of material in a mold apparatus while the sheet of material is subject to high pressures associated with injection of a moldable material to form a gasket on a portion of the sheet of material includes the steps of providing a high pressure injection mold assembly, the mold assembly having a first mold section and a second mold section, which define a mold cavity therebetween. The method includes the step of forming a first groove on a first seal receiving surface of the first mold section and a second groove on a second seal receiving surface of the second mold section. A first seal is provided in the first groove such that the first seal projects from the first seal receiving surface of the first mold portion and includes a contact surface to engage and press on one surface of the sheet of material. In another aspect, a second seal is provided in the second groove such that the second seal projects from the second seal receiving surface of the second mold portion and includes a contact surface to engage and press on a second surface of the sheet material. The contact surfaces of the seals are pressed perpendicularly to the respective surfaces of the sheet while injecting the moldable material into the mold cavity under a pressure of at least about 2,000 pounds per square inch (psi).

In another aspect, the method provides the step of protecting the first and second seals from high pressures associated with the injection of the moldable material. To protect the first and second seals from the high pressure, a first shoulder is provided between the first groove and the mold cavity and a second shoulder is provided between the second groove and the mold cavity. Furthermore, a first gap is provided between the first shoulder and the sheet of material and a second gap between the second shoulder and the sheet of material. In one aspect, the first and second gaps are provided to be in the range of approximately 0.001 inches to 0.015 inches depending on the stiffness or hardness of the seal material, which protects the seals from the high pressure of the injected moldable material. In another aspect, with a urethane seal, the first gap is in the range of 0.007 to 0.013 inches. The second gap is in the range of 0.001 to 0.003 inches when a PET seal is used. In this manner, the seals provided on the first and second seal receiving surfaces of the mold sections accommodate the variations in the sheet of material. The position of the seals with respect to the mold cavity protects the seals from the high pressures associated with the injection molding of the gasket material. As the gaps between the facing surfaces of the first and second seal receiving surfaces and the sheet of glass are controlled within selected ranges, the seals are further protected from the high pressures associated with the injection of the gasket material. Moreover, these ranges of gaps provide for controlled amount of flash onto the glass sheet.

The improved apparatus and method disclosed herein provides for soft or resilient seals for high pressure molding, the seals suspending the sheet of glass between the two rigid mold sections, which significantly reduces the frequency of glass breakage. The resilient seals are protected from the high pressure of the molding process by their location and by the configuration of the first and second seal receiving surfaces. The flash and overflow is controlled by maintaining the gap between facing surfaces of the first and second seal receiving surfaces of the mold section and the glass sheet in a specified range.

BRIEF DESCRIPTION OF THE DRAWINGS

FIG. 4 is an enlarged sectional view of the closed mold assembly taken along line IV—IV of FIG. 1 illustrating a pair of seals and a sheet of glass held therebetween and projecting into the mold cavity;

FIG. 5 is an enlarged sectional view of the closed mold assembly taken along line V—V of FIGS. 2 illustrating an injection gate;

FIG. 7 is an enlarged sectional view similar to FIG. 4 illustrating the sheet material therein and a second embodiment of the seals;

FIG. 8 is a partial plan view of one-half of a lower mold section of a second embodiment of the present invention adapted for forming vehicular modular window assemblies from PVC injection molding;

FIG. 9 is a partial plan view of one-half of an upper mold section of the invention shown in FIG. 8;

DESCRIPTION OF THE PREFERRED EMBODIMENTS

Figure 1:
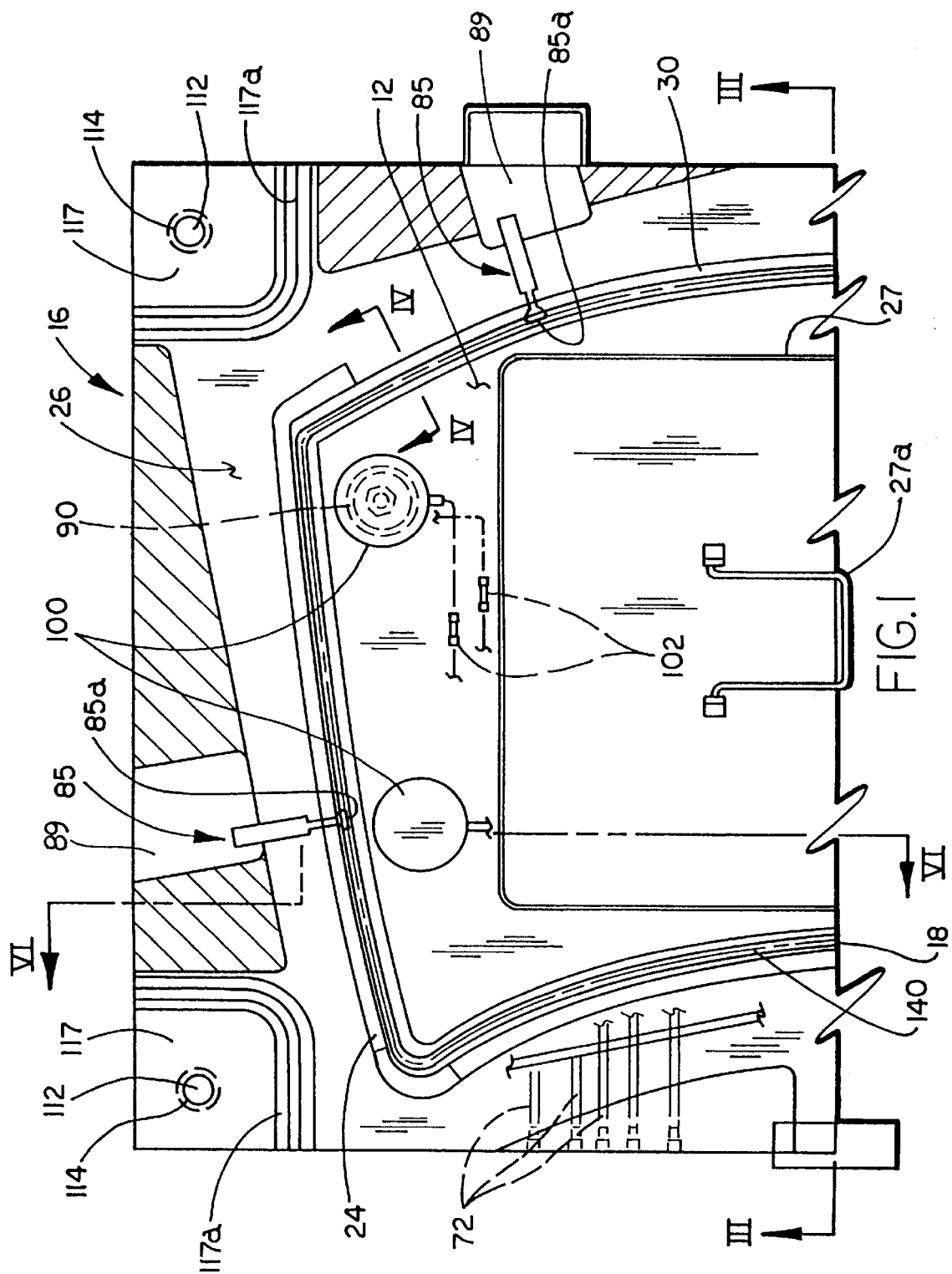
FIG. 1 is a partial plan view of one-half of the lower mold section of the present invention adapted for forming a vehicular modular window assembly from PVC injection molding.

Referring now to the drawings in greater detail, FIGS. 1–7 illustrate a first embodiment of a mold assembly 10 of the present invention adapted for encapsulating a configured, shaped sheet 12 of laminated, tempered or other strengthened, safety glass, which may include a layer of frit on a back surface of the peripheral portion of the sheet, with a peripheral casing or gasket 13 of a molten thermoplastic material, such as polyvinyl chloride (PVC). If a layer of frit is applied to the glass sheet 12, the frit layer (not shown) is typically applied to a rear surface of the glass sheet during the glass sheet forming process, which is used to form an opaque, black ceramic layer. The frit layer typically extends inwardly for one to four inches around the entire periphery to obscure the molded gasket or casing and attachment mechanisms referred to earlier, such as fasteners, and hide them from view from the front glass surface. The gasket or casing with or without an attachment mechanism is typically molded over and on the frit layer. The preferred ceramic paint is manufactured by Drakenfeld Color, Inc. of Washington, Pa. The paint includes small ceramic particles and suitable metal oxide pigment suspended in oil of a type conventionally known in the art applied to the glass surface and fired to fuse the layer to the glass.

Mold assembly 10 includes an upper mold portion 14 (FIGS. 2, 3 and 6) and a lower mold portion 16 (FIGS. 1, 3 and 6), which define a mold cavity 18 therebetween. Upper and lower mold portions 14 and 16 are typically mounted in a molding machine which moves the upper mold portion 14 toward the lower mold portion 16 for holding sheet 12 therebetween and away from lower mold portion 16 when at the end of the molding cycle.

Figure 2:
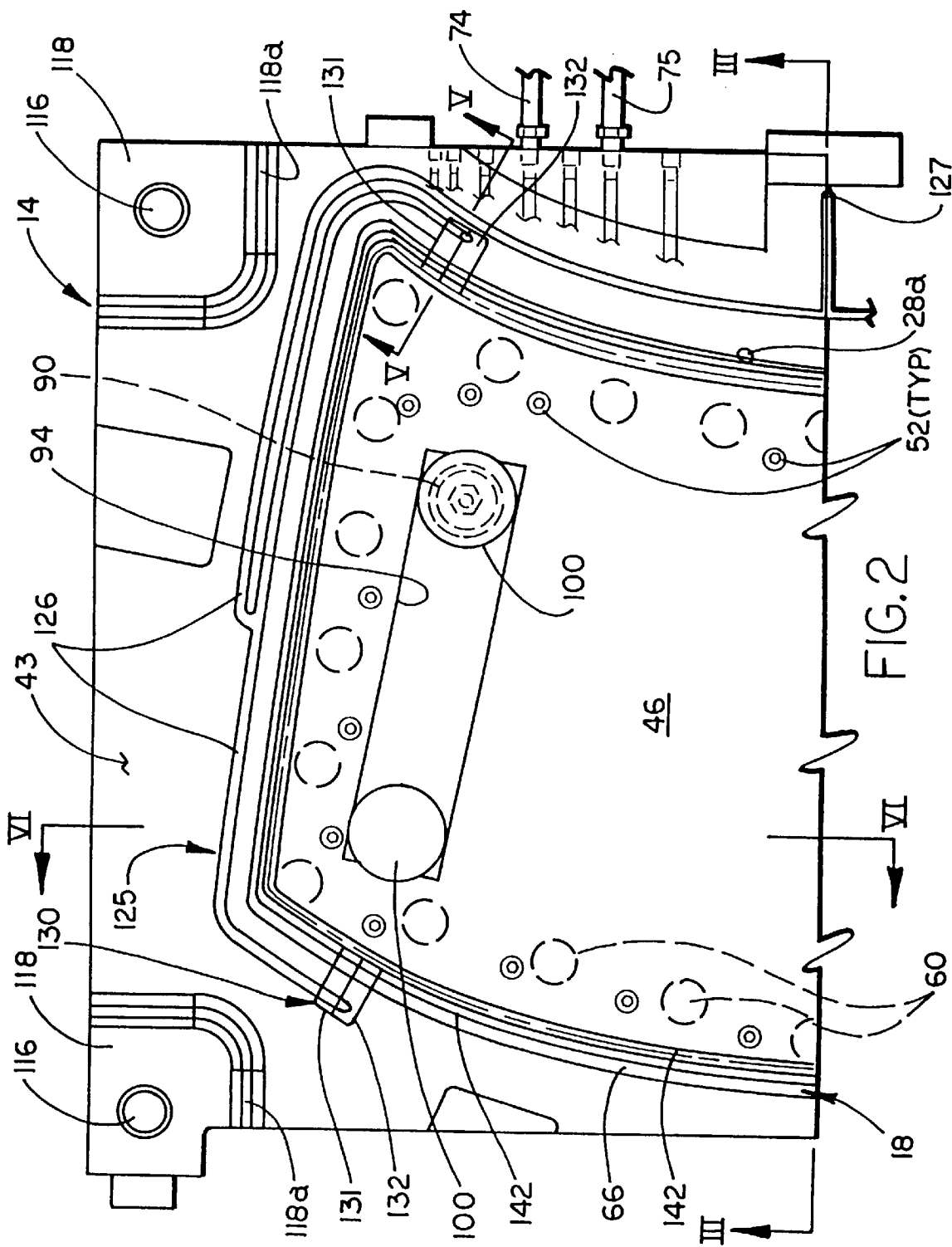
FIG. 2 is a partial plan view of one-half of an upper mold section of the present invention shown in FIG. 1.
Figure 3:
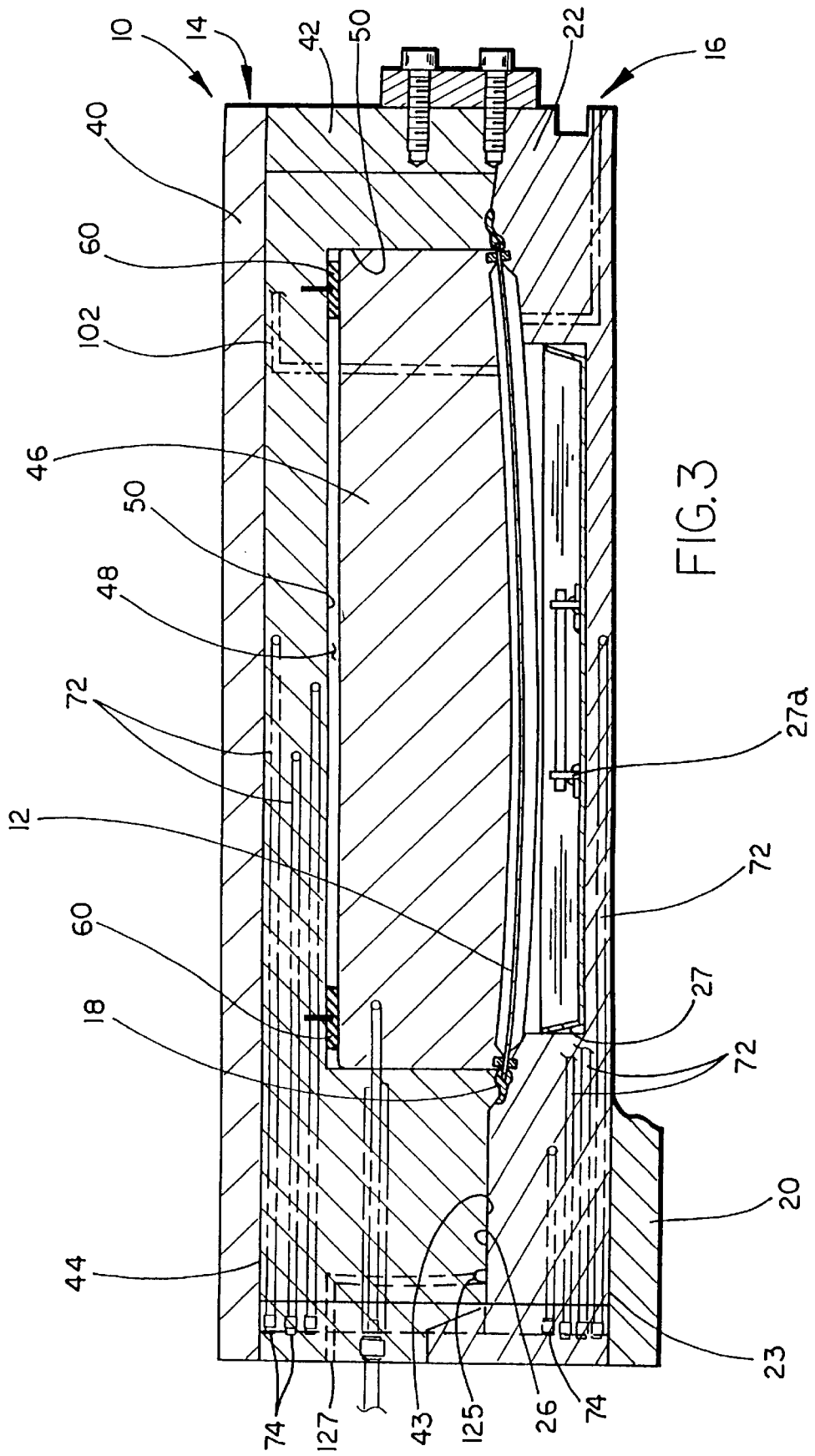
FIG. 3 is a cross sectional view of the closed mold assembly taken along line III—III of FIGS. 1 and 2.

As shown in FIGS. 1–3, lower mold portion 16 includes a lower support 20 to which a lower mold section 22 is secured by bolts (not shown). The lower surface 23 of lower mold section 22 is generally flat and rests on lower support 20 while the upper surface 24 includes a recess/relieved area 25. Upper surface 24 defines a first seal receiving surface, which receives a seal 140 for supporting glass sheet 12 and is curved to the desired contour of the ultimate window shape to be produced with the mold assembly. Upper surface 24 extends around recess area 25, which accommodates different cord heights and variations in the shape of the glass sheet 12 when closed in the mold without breakage, chipping, or damage. Furthermore, recess area 25 includes a removable glass breakage tray 27, which is positioned below the sheet 12 so that the pieces of broken glass may be collected into the tray 27 and removed from the mold assembly 10 in the tray 27 by the tray's handle 27a.

Extending around the periphery of the lower mold section 22 is a planar surface 26 defining the parting line between the upper and lower mold portions 14 and 16. Intermediate the parting surface 26 and first seal receiving surface 24, is the mold cavity 18. Mold cavity 18 includes portions from both the upper and lower mold portions 14 and 16 and forms the casing around the periphery of the glass sheet 12. As best seen in FIGS. 3, 4, 5, and 9, lower mold section 22 includes a lower mold cavity surface 30 of curved configuration, which extends along and outlines the entire periphery of the glass sheet 12 when mounted in the mold assembly 10. Cavity surface 30 of lower mold section 22 extends from a position spaced inwardly of the peripheral edge of the glass sheet 12, when mounted in the mold assembly, to a position outwardly of the glass periphery to form the full width of the gasket or casing.

Figure 6:
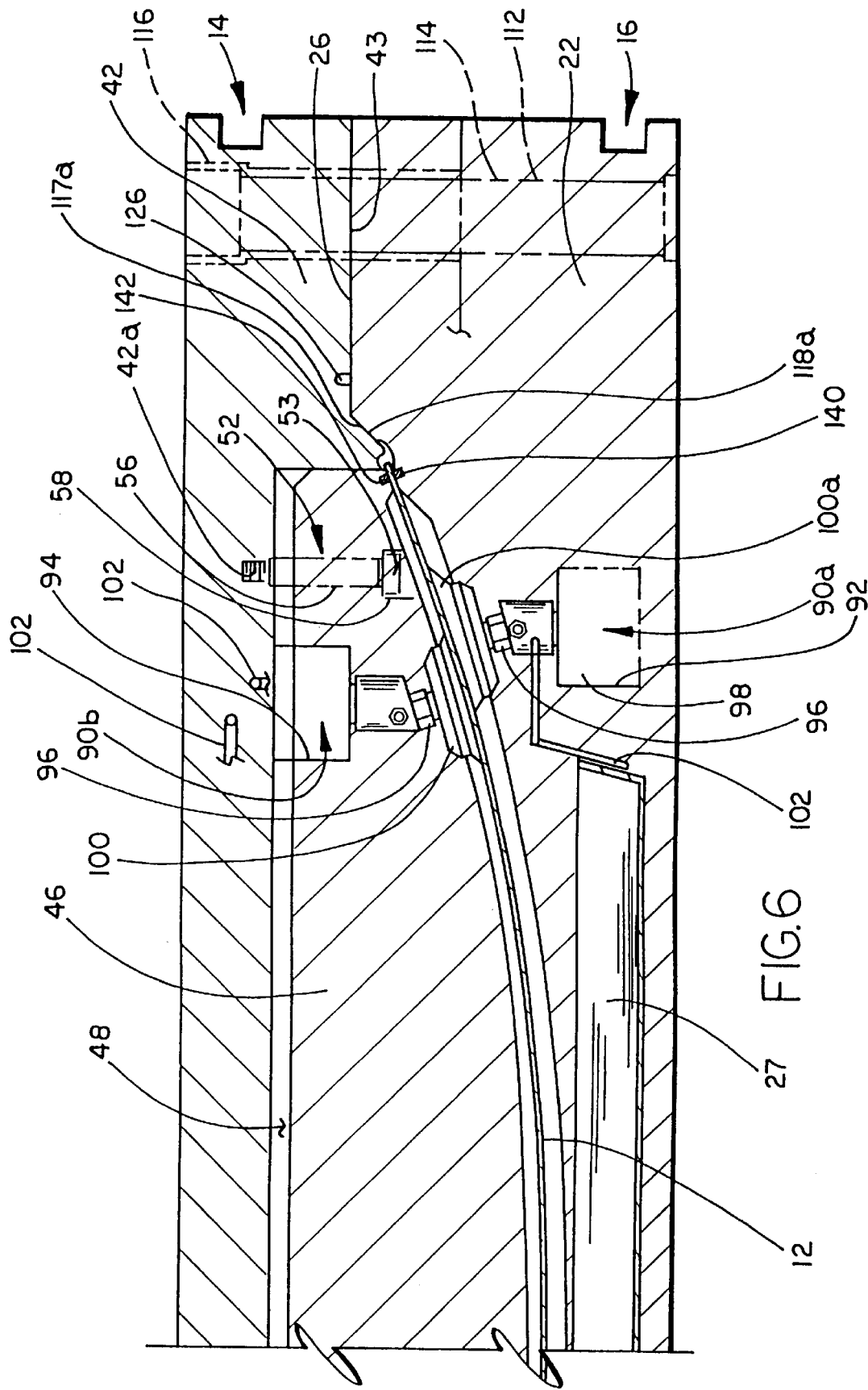
FIG. 6 is a partial sectional view of a portion of the closed mold assembly taken along line VI—VI of FIGS. 1 and 2 showing the sheet material therein and the mold cavity for molding the gasket around the sheet periphery and further illustrating an ejector assembly.
Figure 10:
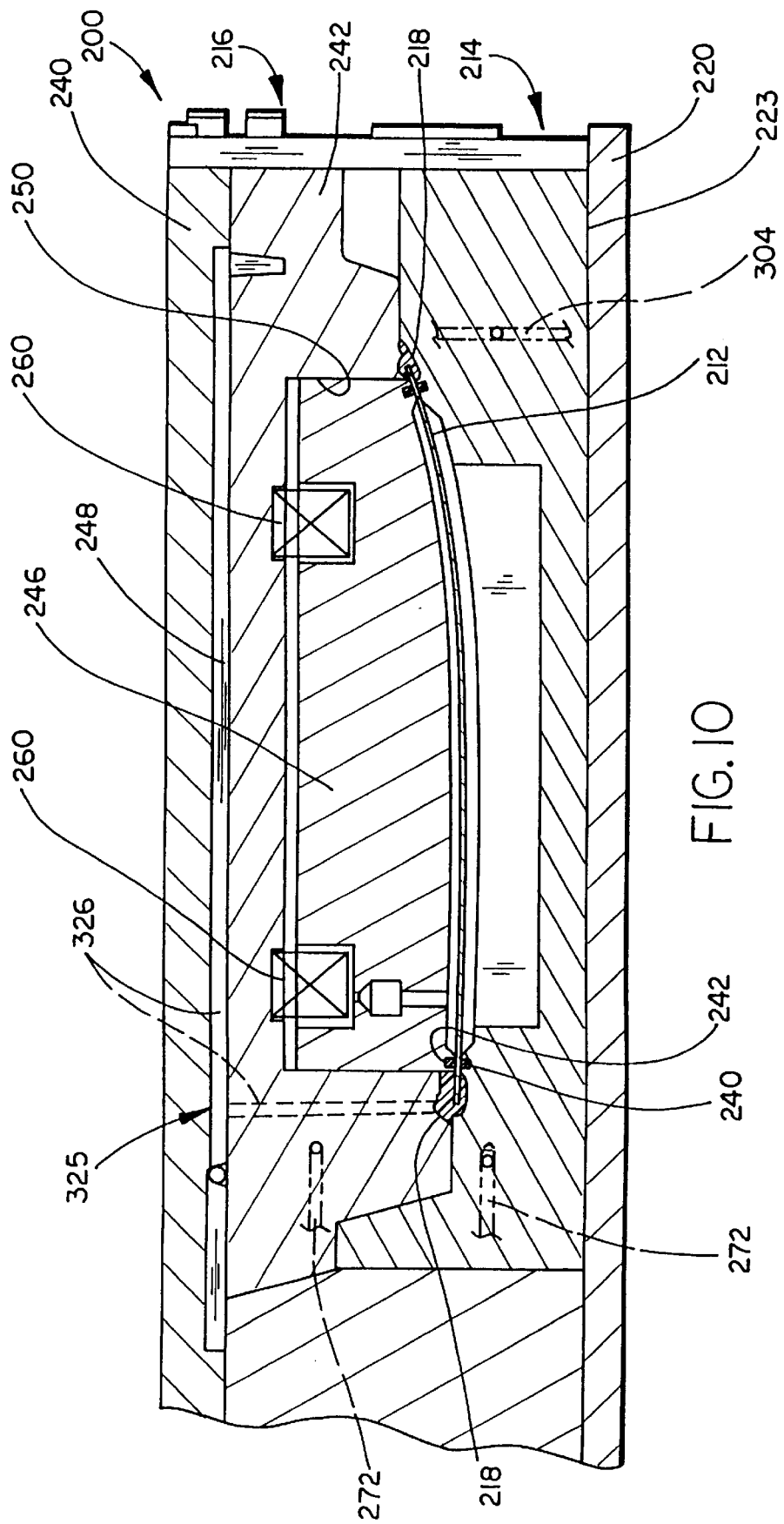
FIG. 10 is a cross sectional view of a closed mold assembly of the second embodiment taken along line X—X of FIGS. 8 and 9 showing the mold assembly enclosing a sheet of glass after the injection of flowable PVC into the mold.
Figure 11:
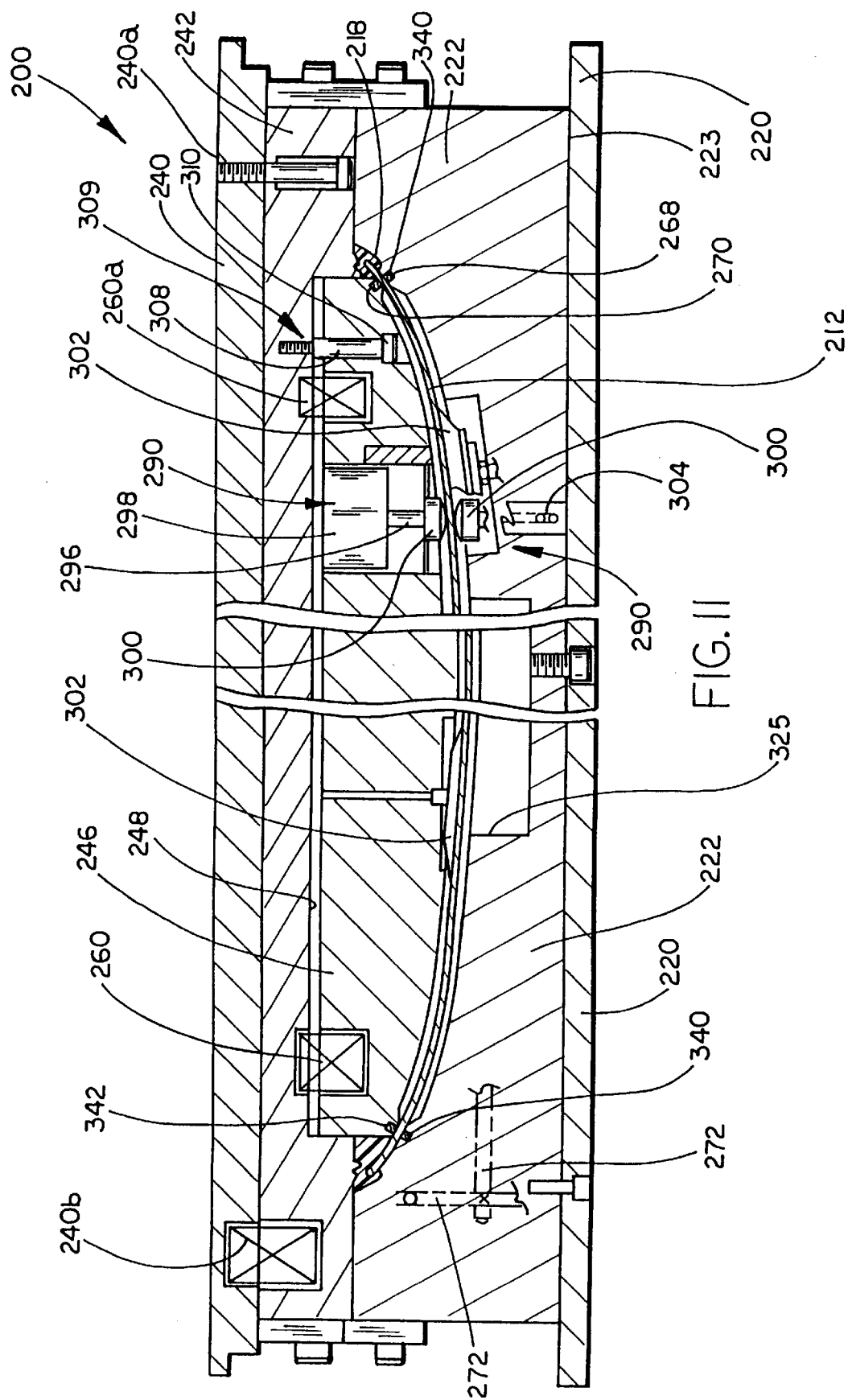
FIG. 11 is a cross sectional view of the closed mold assembly taken along line XI—XI of FIGS. 8 and 9 illustrating an ejector assembly of the second embodiment.

Upper mold portion 14 corresponds to the lower mold portion 16 and includes an upper support plate 40 to which an upper mold section 42 is bolted (not shown). Upper mold section 42 includes a planar upper surface 44 for engaging the upper plate 40 and a planar lower surface 43 extending around its periphery which also defines the parting surface for the upper mold section 42. Planar surface 43 engages parting surface 26 on the lower mold section. In order to prevent compression, fracture, or other damage to the supported glass sheet 12 when the glass sheet 12 is inserted within the mold assembly 10, upper mold section 42 includes a rigid, slidable moveable mold portion or pressure pad 46 mounted within a central recess 48, defined by generally vertical walls 50 in the upper mold section 42. Pressure pad 46 has an outline corresponding in shape to the periphery of the sheet of window glass 12 which will ultimately form the window assembly and is slidably mounted within recess 48 along walls 50 on a series of downwardly extending headed support bolts 52 (FIGS. 2 and 6), which are mounted at spaced locations around the periphery of the pressure pad 46. Bolts 52 provide guides and are threaded into apertures 42*a* in the lower surface of the upper mold section 42 (FIG. 6) and extend into corresponding cylindrical bores 56 provided in pressure pad 46. As best seen in FIG. 6, the heads 53 of bolts 52 are received in slightly larger cylindrical recesses 58 formed in pressure pad 46, which extend into the lower surface of the pressure pad 46.

To urge pressure pad 46 toward the lower mold section 22, a plurality of resilient members or springs 60 (FIG. 3) are interposed between a top surface of pressure pad 46 and the upper surface of the recess 48, each aligned such that the springs 60 urge pressure pad 46 outwardly from upper mold section 42 toward the first seal receiving surface 24. Springs 60 preferably comprise urethane discs but may also comprise conventional springs, hydraulic cylinders, pneumatic bladders, or any other resilient material that may be substituted for springs 60 to provide appropriate biasing force for the pressure pad against the glass sheet 12. The top of recess 58 engages the head 53 of bolt 52, to limit outward extension of the pressure pad 46. The lower surface of pressure pad 46 includes a peripheral second seal receiving surface 62 (FIG. 4) which is contoured to the shape of the glass sheet 12 and receives a second seal 142 for engagement with the sheet of glass 12 without damage to the sheet 12. The first and second seals 140 and 142 substantially suspend the glass sheet 12 between the upper and lower mold sections 42 and 22 so that the mold assembly 10 can accommodate the variations in the glass sheet 12.

The central area of the glass facing side of the pressure pad 46 includes a recess/relieved area 64 (FIG. 4) which extends inwardly from the inner periphery of second seal receiving surface 62. Accordingly, when the upper and lower mold sections 22 and 42 are closed, pressure pad 46 is urged toward glass sheet 12 by springs 60 and firmly positions glass sheet 12 against seal 140 in the first seal receiving surface 24 with a periphery of the sheet extending into mold cavity 18. The resiliency of pressure pad 46 on spring 60 also helps eject the completed molded window assembly from the mold after formation when the mold is opened.

As seen in FIGS. 4 and 7, a molding surface 66 defining the upper mold cavity surface is formed in the area between the peripheral edge of pressure pad 46 and the planar parting surface 43. Upper mold cavity surface 66 extends substantially parallel to the upper surface of the glass sheet and then curves downwardly toward the lower cavity surface 30 after which again curves upwardly to meet the parting surface 43. This configuration defines a weather strip or seal in the finished window assembly, which seals against the vehicle body when the window is installed. The inner edge of the upper mold cavity surface is defined by the outer periphery of the pressure pad 46 and extends downwardly to a position spaced slightly above the surface of the glass sheet. Accordingly, when the upper and lower mold portions 14 and 16 are closed, mold cavity 18 is defined by the peripheral edge of the pressure pad 46, upper surface 66, and lower cavity surface 30. First seal receiving surface 24 of lower molding section 22 includes a recess or groove 68, spaced inwardly from the periphery of the first seal receiving surface 24, whose inner and outer walls extend upwardly toward the glass. In a similar manner, pressure pad 46 includes a groove or recess 70, spaced inwardly from the peripheral edge of the pressure pad 46, whose inner and outer walls extend downwardly toward the glass. Inner and outer walls of recesses 68 and 70 are generally parallel and define generally rectangular cross-sections for holding seals 140 and 142 therein, as will be more fully discussed hereafter.

Mold assembly 10 is adapted to form a gasket or casing from a molten, thermoplastic gasket or casing material such as polyvinyl chloride (PVC), or another resinous material, for example thermoplastic rubber or thermoplastic urethane, which must be injected under high pressure and elevated temperature. Typical temperature ranges for PVC injection are on the order of approximately 375° to 410° F. at a pressure of between about 2,000 and 5,000 pounds per square inch (psi). In order for molten gasket material to form the gasket, it must be cooled. Therefore, mold assembly 10 includes a cooling system, which includes a series of water passageways 72 (FIGS. 1 and 3). Water passageways 72 interconnect to an external water supply through inlet 74, and discharge to an external discharge system through an outlet 75 in each mold section. When the mold assembly 10 is in use, cold water is pumped into inlets 74 and through the upper and lower mold sections 42 and 22 to cool the mold sections 42 and 22 so that the gasket material will properly cure and set during the molding process. The water cooling temperatures are preferably maintained at a generally constant temperature in a range from 110° to 130° F. and circulated constantly during the molding process.

To aid in the alignment of the glass sheet 12 in the mold assembly 10, mold assembly 10 includes a plurality of adjustable glass holders or positioning guides 85 mounted in a recess 89 of lower mold section 22. Glass holders 85 are conventionally used in molding apparatus and assist in the positioning and aligning of the glass sheet 12 in the mold assembly 10 by providing rigid markers for the perimeter of the glass sheet 12. When an operator places the glass sheet 12 in mold assembly 10, the operator places the sheet so that the sides of the sheet 12 abut the free ends 85*a* of the glass holders 85 to assure proper placement of the sheet within the mold assembly 10.

The separation of the glass sheet 12, with the molded gasket 13 (FIG. 4), from the mold assembly 10 after molding is achieved by cooperating ejection assemblies 90 (FIG. 6), which are secured in recesses 92 and 94 provided in upper and lower mold portions 14 and 16, respectively. Each of the ejector assemblies 90 is generally identical and includes a rod 96 which extends outwardly from an air operated cylinder 98 upon opening the mold assembly 10. A suction cup assembly 100 is secured to the outer end of each rod 96 by a threaded connection. Suction cup assemblies 100 are provided on the lower ejection assemblies to hold the glass sheet in place during the molding process and while the upper mold section 42 is raised. Suction cups 100 have an outer surface that will not scratch or mar the surface of the glass sheet when moved into contact with the glass and are actuated by evacuation of air to grip the sheet of glass 12. The air is supplied to or removed from the suction cups 100 and cylinders 98 by tubing 102. Lower suction cup 100a is actuated to hold the underside of the glass sheet 12 when the glass sheet 12 has been placed in the mold and aligned with the glass holders 85 so that the glass sheet is held by the suction cups 100aduring the molding and encapsulation process. This insures that the glass will not shift during the molding process.

When mold assembly 10 is opened, conventionally known controls deliver the air to tubing 102 to actuate air cylinders 98 of upper ejector assembly 90b to extend rod 96 outwardly to contact glass sheet 12 to separate glass sheet 12 from surface 62 and pressure pad 46 and separate the gasket 13 from the mold cavity 18, especially if there is any suction or vacuum created behind the glass surface. Thereafter, when the upper mold section 42 is moved away from the lower mold section 22, the lower ejector assemblies 90a are actuated by conventionally known controls to extend rods 96 and lift the entire modular window assembly from surface 24 and allow an operator to manually remove the capsulated sheet of glass 12 from the mold assembly. Suction cups 100a help retain glass sheet 12 in place so that it can then be moved by an operator.

As best seen in FIGS. 1, 2, and 6, upper and lower mold sections 42 and 22 are guided and located with respect to one another when the mold assembly 10 is closed by a plurality of cylindrical guide pins 112 mounted adjacent the corners of the lower mold section 22. Guide pins include upwardly extended cylindrical portions 114 which are received in guide bushings 116, which are mounted in the corresponding corners of the upper mold section 22. Accordingly, projections 114 are received in bushings 116 to register and to align the upper and lower mold cavity surfaces 66 and 30 around the periphery of the sheet 12 to properly form mold cavity 18. Furthermore, guide pins 112 are mounted in a raised corner section 117 of the lower mold assembly 22. Similarly, bushings 116 are mounted on a recessed corner portion 118 of upper mold section 42. The sides 117a of the raised corner portion 117 in the lower mold section 22 are sloped. The walls 118a of the recessed corner portion 118 of upper mold section 42 are similarly sloped so that the recessed corner portion 118 and raised corner portion 117 cooperate to further align upper mold portion 14 and the lower mold portion 16 of the assembly 10. Moreover, the sloping sides 117a of the respective raised corner 117 and sloping walls 118a of the recess 118 provide a lateral restraint which prevents the upper mold portion 14 and lower mold portion 16 from shifting with respect to each other when the mold assembly is injected with the molten thermoplastic material.

As shown in FIGS. 2, 3 and 5, after closing of the mold assembly 10, molding material, which preferably comprises a thermoplastic material such as PVC, is injected into mold cavity 18. The molten gasket material is delivered to the mold cavity 18 by a cold runner system 125. Cold runner system 125 comprises a plurality of channels 126 formed in upper mold section 42 which extend from an inlet port 127 provided in the upper mold portion 16 to the cavity 18. The channels 126 extend from the inlet port 127 to a plurality of injection gates 130, which are positioned along the periphery of the upper mold pressure pad 46 and are positioned at spaced positions along and above cavity 18. Channels 126, while positioned in the upper mold section 42 of mold assembly 10, are in communication with the planar parting surface 26 of the lower mold section 22 of the mold assembly. Thus, when the molding process is complete and the upper portion mold section 42 lifted off the lower mold section 22 of the mold assembly 10, the thermoplastic material which still remains in the channels 126, will be solidified and can be manually removed from channels 126 after the process is complete.

Gates 130 comprise first and second gate halves 131 and 132, which are secured together by a plurality of fasteners 133 (FIG. 5). Each gate 130 includes an inlet 134 and an outlet 135. The inlet is in communication with channels 126, while the outlet 135 opens directly into the mold cavity 18. Extending between inlet and outlet 134 and 135 is a passageway 136 which is formed by corresponding channels 136a. 136b provided in the respective gate halves 131 and 132. As best seen in FIG. 5, the passageway 136 has a generally cashew shape path with a larger cross section at the inlet 134 and a smaller cross section at the outlet 135. The necked-down, smaller cross section at the outlet 135 permits the solidified thermoplastic that remains in the cashew passageway to be easily trimmed off the final gasket 13 formed on the periphery of the glass sheet 12. The tapered shape allows solidified thermoplastic material to be manually withdrawn through inlet 134 when the mold is opened.

As described previously, grooves 68 and 70 are formed in the respective first and second seal receiving surfaces of pressure pad 46 and lower mold section 22 for housing seals 140 and 142. Grooves 68 and 70 preferably include a square shaped channel cross-section (FIG. 4). Groove 68 preferably has dimensions in the range of approximately 0.22" to 0.23" for depth and 0.230" to 0.24" for width. Groove 70 preferably has dimensions in the range of approximately 0.21" to 0.22" for depth and 0.230" to 0.24" for width. As best seen in FIGS. 4 and 7, seal 142 extends beyond the lower surface of the pressure pad 46 to engage the glass sheet 12. Preferably, seal 142 extends approximate 0.01" from the second seal receiving surface 62. Furthermore, seal 142 is spaced from the periphery of the pressure pad 46 in groove 68 so that the seal 142 is protected from the high pressure associated with the injection of the thermoplastic material. Preferably, the distance from the peripheral edge of the pressure pad 46 and the first outer wall of groove 70 is in the range of 0.08 inches to 0.135 inches. More preferably, the distance from the peripheral edge of the pressure pad 46 and the first outer wall of the groove 70 is in a range of approximately 0.115 inches to 0.135 inches. It has been found under high pressure that a shoulder 144, which is formed by the spacing of the seal 142 from the periphery of the pressure pad 46, protects the seal from the high pressure. On the other hand, this distance must be kept relatively small in order to reduce the amount of flash that occurs on the portion of the glass extending under the shoulder 144. In most applications, where the glass sheet variations are within normal ranges, seal 142 is preferably a urethane material. Most preferably, seal 142 is a thermoset polyurethane, type GC1095, available from Gallagher, in Gurnee, Ill., with a durometer of 95 shore A. Alternatively, for the glass sheets having greater degrees of variation, seals 140 and 142 may comprise a silicone rubber material, such as a silicone rubber under the formulation of ULTRASIL, available from United Silicone, Inc. in Lancaster, N.Y., which has a durometer of 80 shore A. The silicone rubber will provide a softer seal and, therefore, will better accommodate to the variations in the sheet of glass 12. However, a greater amount of flash may be experienced when using the silicone seal because the gap between surface 62 or 24 and the surface of the glass sheet will be somewhat larger.

Lower seal 140 is similarly positioned in groove 70 of first seal receiving surface 24 of the lower mold section 22. Seal 140 is similarly spaced from the edge of the first seal receiving surface 24 to prevent the high pressure associated with the injection process from damaging seal 140. A corresponding shoulder 146 is formed on the first seal receiving surface, which has similar dimensions to the shoulder 144 of the pressure pad 46. In applications, where the glass sheet 12 has less variation, i.e., less highly curved glass configurations, seal 140 may comprise a polyethylene terephthalate (PET) seal, available from Alro Plastics, in Jackson, Miss. PET seals are generally less flexible than urethane seals. Consequently, the gap between surface 24 and the glass sheet can be less, and the amount of flash, if any, is minimal. As best seen in FIG. 4, the PET seal 142 projects from the second seal receiving surface 62 of the lower mold portion 14 by a distance in the range of approximately 0.001 inches to 0.003 inches. In other applications, a single seal may be provided on either the pressure pad 46 or the first seal receiving surface 24 of lower mold section 22. However, as best seen in the second embodiment of FIGS. 8–16, in applications where the glass sheet has a greater degree of curvature or variation, both seals 140 and 142 may comprise silicone rubber as described above. With silicone rubber seals, however, the gap between the first seal receiving surface 24 and the glass sheet is then increased to a range of approximately 0.007 to 0.015 inches, preferably 0.007 to 0.013 inches.

After sheet 12 of pre-cut safety glass is placed on the seals 140 in the first seal receiving surface 24 with its peripheral edge extending into the mold cavity 18, mold assembly 10 is closed. The glass sheet 12 preferably has previously been cleaned and primed around its periphery with a primer material in the areas to receive the gasket material, which promotes adhesion of the gasket material to the glass. After the glass is primed and the glass sheet 12 is placed in the lower mold section 22 of mold assembly 14, as guided by holders/guides 85, the mold assembly 10 is closed as guided by pins 112 which register with bushings 116 to cause the mold cavity surfaces 30, 66 to properly align with one another. During closing, seal 142 in surface 62 engages the periphery of the upper surface of the glass sheet 12 and forces the glass sheet 12 against seal 140 the first seal receiving 24 in the lower mold section 22, causing the seals to compress slightly, depending on their hardness. No breakage or fracture of the glass sheet 12 occurs since the glass sheet is effectively suspended between the upper and lower mold sections 42 and 22 which permits accommodation of greater variations in the glass dimensions. The force of the springs 60 for pressure pad 46 is chosen to be sufficient enough to seal off and prevent flash or overflow of the molding material from the mold cavity to the viewing area of the glass but not so strong as to break the glass. Spring pressure may be adjusted with shims, spacers, or substitution of different springs of different strength.

After mold assembly 10 is closed, and vacuum cup assemblies 100a are activated, the upper mold section 42 is clamped with conventionally known apparatus in the molding machine at a clamping pressure adequate to control flash or overflow. Typically, such pressures are in the range of 400 to 600 tons for larger rearview windows and 200 to 400 tons for smaller side windows, depending on the projected area of the gasket to be formed. The molten gasket material is injected into the mold cavity 18 at approximately 2,000 to 5,000 psi. Pressure within the mold cavity is monitored by a conventional pressure transducer 28a (FIG. 2) so as to prevent over pressurization of the cavity. Upon initial injection, the material fills the cold runner system 125, which directs the molten gasket material to the mold cavity 18 through gates 130. While some flash may be exhibited below the shoulders 144 and, possibly, above shoulders 146, it is sufficiently controlled so that it can be easily removed from the glass sheet 12 after molding. Upon filling of the mold cavity 18, the mold material, when entering from passageways 136, forces any air in cavity 18 which is not vented through the parting surfaces 26 and 43 through vents (not shown) provided in the lower portion of the mold cavity. Air contained in mold cavity 18 is vented to the atmosphere through a vent line which couples to the vent in the mold cavity, which is provided in the lower mold portion 16 of the mold assembly 10. In addition, small passageways may be formed along the parting surfaces of the upper and lower mold portions to allow air to escape from mold cavity 18 but are sufficiently small to prevent escape of any molding material.

Cold water is pumped through passageways 72, 74 to cool the upper and lower portions 14 and 16 of the mold assembly 10 so that the molten gasket material will cure after it reaches and fills the mold cavity 18. The temperature of the water is maintained in a range of approximately 110 degrees to 130 degrees. After an appropriate curing time, usually in the range of 120 to 140 seconds, the mold assembly is opened and the ejector assemblies 90 are actuated, by air delivered in tubing 102, to push sheet 12 off upper mold section 42. Furthermore, ejector assemblies 90a urge glass 12 outwardly from the lower portion 16 of the mold assembly 10 to allow removal of the glass sheet 12.

As shown in FIGS. 8–16, a second mold assembly 200 is illustrated. Mold assembly 200 is generally similar to the mold assembly 10 and includes a lower mold portion 214 and an upper mold portion 216, which define a mold cavity 218 therebetween. Lower portion 214 of mold assembly includes a lower mold section 222 having a lower surface 223 and an upper surface 224. Lower mold sections 222 is supported on a lower support member 220. Upper portion 216 of mold assembly 200 includes an upper mold section 242 and a movable pressure pad 246, which is movably mounted in the upper mold section 242 in recess 248. In a similar manner to the previous embodiment, lower mold section 222 and pressure pad 246 include grooves 268 and 270 formed on their first and second seal receiving surfaces 224 and 262 (FIG. 12), respectively. Mold assembly 200 is proportioned to support a larger glass sheet 212, for instance a sheet of glass used for a sun-roof window, rear window, or a tailgate, and is more typically used with sheets of glass 212 which have greater variations in their surfaces. To accommodate these greater variations in the surface of the glass sheet 212, mold assembly 200 includes seals 340 and 342 in grooves 268 and 270, which are preferably silicone rubber as described above in connection with embodiment 10. By providing seals 340 and 342 with a material having greater flexibility, the variations in the glass sheet 212 can be better absorbed by seal 340 and 342.

Again, in a similar manner to the previous embodiment, seals 340 and 342 are spaced from the periphery of the pressure pad 246 and the second seal receiving surface 262. Shoulders 344 and 346 are defined by the space between the seals 340 and 342 and the edge of the mold cavity 218, which protect the seals 340 and 342 from the high pressure associated with the molten gasket molding process.

In order to protect seals 340 and 342 and to control the flash, mold assembly 200 provides gaps preferably in the range of approximately 0.007 inches to 0.013 inches between the second seal receiving surface 262 of the pressure pad 246 and the top surface of the glass sheet 212 and gaps in the order of approximately 0.007 inches to 0.013 inches between the lower surface of the glass sheet 212 and the first seal receiving surface 224 of lower mold section 222. It has been found that while these gaps result in an increased amount of flash on the upper and lower surfaces of glass sheet 212, this flash in controlled by the width of the shoulders 244 and 246 and by the height of the gaps. It has been found that a gap in the specified ranges recited above will assure that the flash produced will be of sufficient thickness to be easily trimmed and removed from the glass 212.

Similar to the previous embodiment, mold assembly 200 further includes ejection assemblies 290. In this embodiment, each ejection assemblies 290 includes a padded or resinous plastic head 300 on the distal end of rod 296, which extends in and out of an air cylinder 298. Heads 300 are each threadingly secured to the outer end of the rod 296 and generally circular in shape, with an outer surface or layer of nylon or other resilient material which will not scratch or mar the surface of the glass sheet when moved into contact with the glass sheet 212. Ejection assemblies 290 are supported in a similar fashion to the ejection assemblies 90 of the previous embodiment and are housed in recesses 292 and 294 provided in lower and upper mold sections 222 and 242 of mold assembly 200, respectively. A plurality of suction cup assemblies 302 are provided adjacent ejection assemblies 290 to hold the glass sheet during the molding process and after the upper mold section 242 is removed from the lower mold section 222. Each suction cup assembly 302 includes a conventional suction cup, which cooperates with a pneumatic air system, which supplies air to the suction cups 302 through tubing 304. Tubing 304 delivers and removes air to and from the suction cups 302 and to and from cylinders 298 so that when the encapsulation process is complete and the upper portion 216 of mold assembly 200 is raised off the Glass sheet 212, the glass sheet 112 is lifted off the upper mold section 242 by the extension of the rods 296 of ejectors 290 in the upper mold section and lifted off lower mold section 222 by the extension of rods 296 of the ejection assemblies in the lower mold section. Glass sheet 212 is held in place by suction cup assemblies 302 for removal by an operator.

Pressure pad 246 is supported from the upper support mold section 242 by a plurality of bolts 252 (FIG. 9), which include enlarged bolt heads 253. Bolts 252 operate in a similar manner to bolts 52 of the previous embodiment, in that they permit the pressure pad 246 to move from a fully retracted position within the central recess 248 of upper mold section 242 to an extending position in which pressure pad 246 presses against glass sheet 212. In this particular embodiment, pressure pad 246 is biased in the extended position by a plurality of coil springs 260. Springs 260 comprise conventional coil springs available from AJACS Die Sales Corp. in Grand Rapids, Mich. However, springs 260 may comprise, as illustrated in reference to the previous embodiment, a urethane spring having a cylindrical body.

In order to further improve the ability of the pressure pad 246 to accommodate the variations of the glass sheet 212, pressure pad 246 includes a plurality of separate pressure pad portions 308 (FIGS. 9 and 11), which are independently supported from the upper mold section 242, one at each forward corner of the window. The independent pressure pad sections 308 include a pair of springs 260a which bias the independently supported pressure pad portion 308 from the upper surface of the upper mold section 242. Furthermore, pressure pad portions 308 are supported by bolts 309 which include enlarged heads 310. The enlarged heads 310 of bolts 309 are captured in a recess formed in the upper surface of the pressure pad portions 308 and permit limited movement of the pressure pad portion 308 from a retracted position abutting the upper surface of the upper mold section 242 to an extended position where they abut the periphery of the glass sheet 212.

Figure 15:
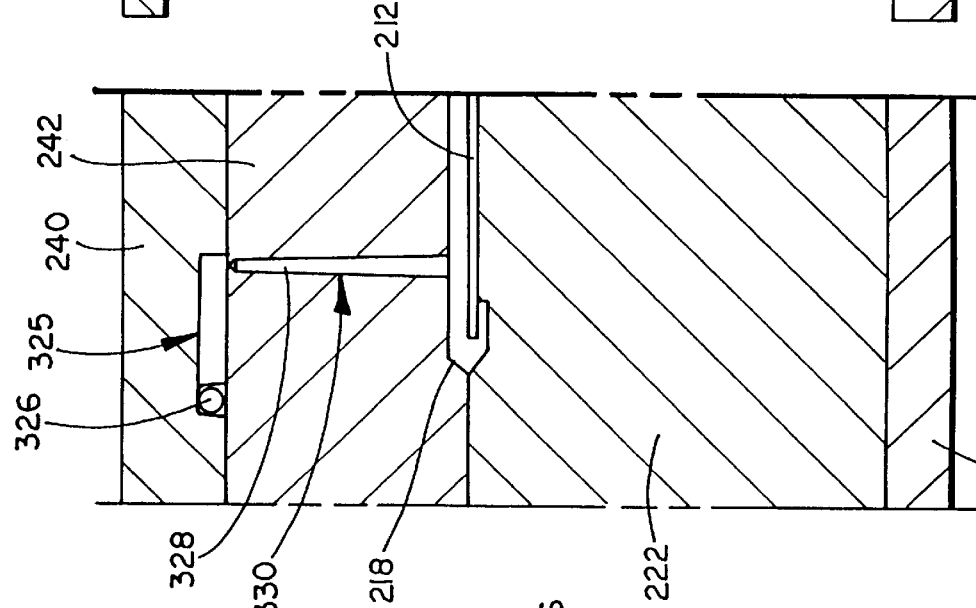
FIG. 15 is a cross sectional view taken along line XV—XV of FIGS. 8 and 9 illustrating an injection gate of the second embodiment.
Figure 14:
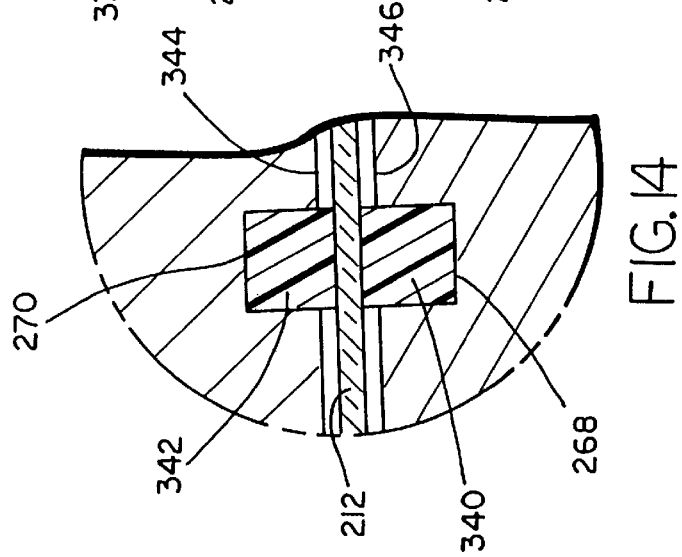
FIG. 14 is an enlarged partial sectional view similar to FIG. 12 illustrating the sheet material therein and the seals supporting the sheet.

The molten gasket material is delivered to the mold cavity 218 by a cold runner system 325 (FIGS. 15). Cold runner system 325 includes a plurality of channels 326 extending from an inlet port 327 (FIG. 9) provided in the mold assembly 200. Channels 326 extend from the inlet port 327 to a plurality of gates 330. Gates 330 comprises a plug gate extending from the channel 326 downwardly to a portion adjacent the mold cavity 218. Each gate generally includes an elongated passage way 328 having a first cross section at the juncture of the passageway and the channel 326 and a second larger cross section at the juncture of the passageway and the mold cavity 218. During the injection process, cooling water is delivered through a system of water passages, provided by tubing 272 (FIGS. 10 and 11), which extend through the upper and lower mold sections 242 and 222. The cooling water cools upper and lower mold sections 242 and 222 and the injected molten gasket material as described in reference to the previous embodiment. This allows the solidified gasket material in the gate to be easily removed from passageway 328. The portion of the solidified gasket material which remains in the passageway is then trimmed from the gasket. In addition, upper mold plate 240 is movable on springs 240b and bolts 240a away from the top surface of mold section 242 to allow access to channels 326 when the mold assembly is opened. This allows the solidified mold material in channels 326 to be manually removed prior to the next mold cycle.

Figure 12:
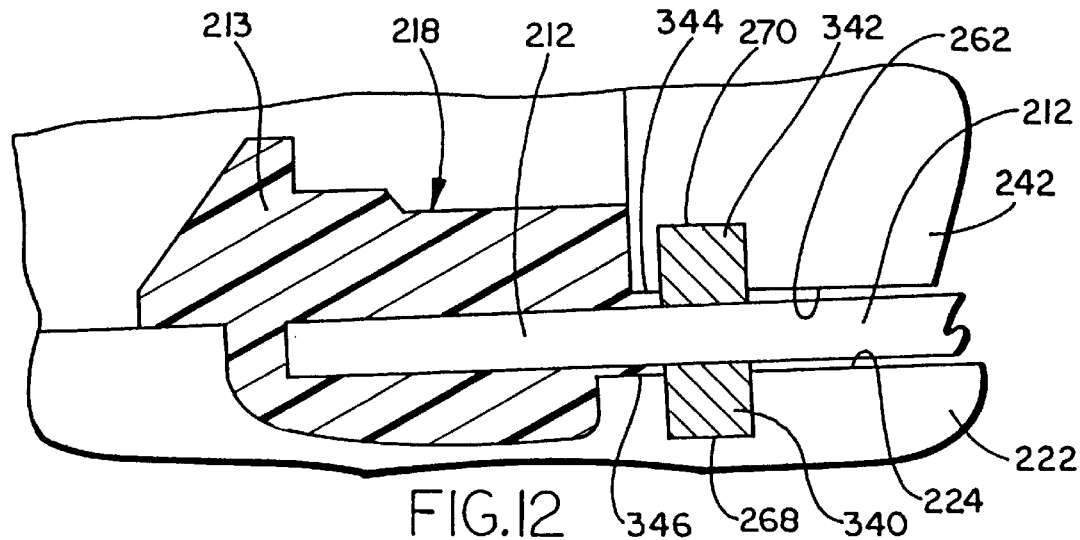
FIG. 12 is an enlarged sectional view of a portion of the closed mold assembly taken along line XII—XII of FIGS. 8 and 9 illustrating the sheet material therein and a third embodiment of the seals.

As best seen in FIG. 12, groove 270 is spaced apart from the peripheral edge of the pressure pad 246 a first distance, defining a shoulder 344. Groove 268 is spaced apart from the peripheral edge of the first seal receiving surface 224 of the lower mold portion a second distance, defining a second shoulder 346, wherein the first distance is generally less than the second distance. Shoulder 344 preferably has a width in the range of approximately 0.08 inches to 0.135 inches. Shoulder 344 more preferably has a width in the range of approximately 0.115 inches to 0.135 inches. However, in some applications one of the distances may be increased so that the upper and lower seals are aligned above and below the glass sheet 112 with the shoulder on the short radius side of the glass having a width in the range of approximately 0.08 inches to 0.135 inches and, more preferably, in the range of approximately 0.115 inches to 0.135 inches.

Figure 13:
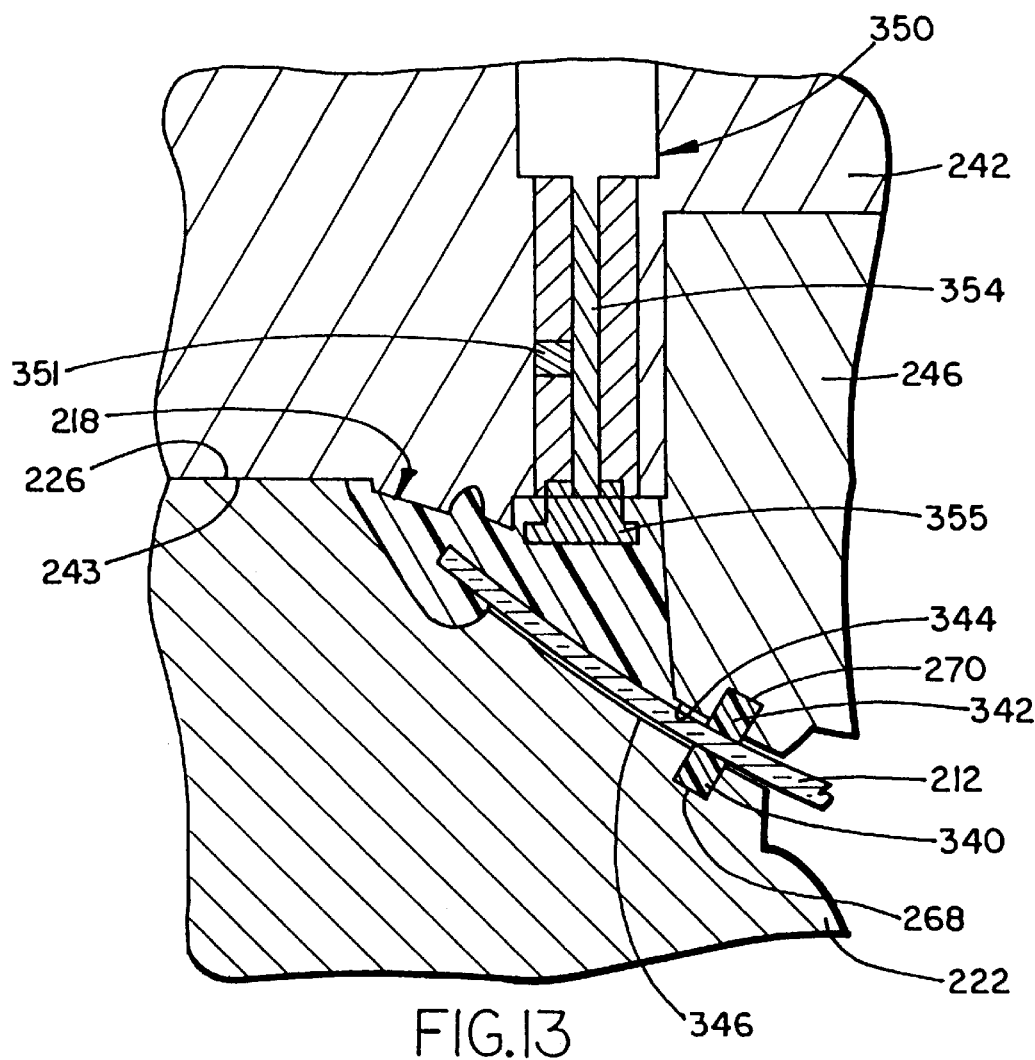
FIG. 13 is an enlarged sectional view of a portion of the closed mold assembly taken along line XIII—XIII of FIGS. 8 and 9 illustrating the sheet material therein and a second embodiment of the gasket material with an insert molded therein.
Figure 16:
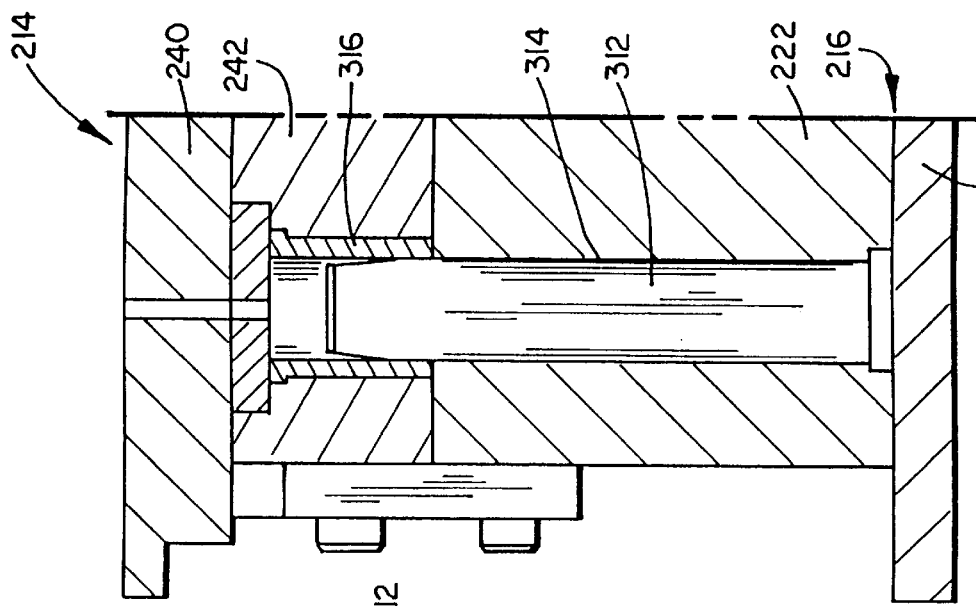
FIG. 16 is a cross sectional view taken along line XVI—XVI of FIGS. 8 and 9 illustrating a pin and bushing assembly of the second embodiment.

Additional fasteners or studs 354 for molding into the gasket material may be inserted and retained in support assemblies 350 at spaced positions around peripheral of the mold cavity 218 as shown in FIG. 13. Each support assembly 350 has a stepped, rectangular recess 352 into which fastener or stud 354 may be fitted before molding. Preferably, stud 354 is held in place by a magnet 351 or other releasable device so that after the molten thermoplastic material is injected into the mold cavity and the thermoplastic material cures, the stud will not induce stresses into the gasket formed by the thermoplastic material. Molding material flows around the insert 354 to mold and embed it into the gasket with its upper end projecting out of the gasket for attachment to a vehicle. Insert 354 includes a base 355 which extends into a recess 352 to seal off the flow of the molding material around the upper end of the fastener as shown in FIG. 13.

In operation, mold assembly 200 is used essentially as described for assembly 10 except that any fasteners which are to be molded along with the gasket are inserted into the upper mold section 242, and held therein by the support assembly 350 prior to closing the mold. The fasteners are thus molded in place during the molding procedure. The sheet of glass 212 is delivered to the mold assembly 200 by an operator and positioned in the assembly with the help of glass holders 335 (FIG. 8), which provide rigid markers for the position of the glass sheet 212 periphery in a similar manner to the previous embodiment. The upper mold section 242 is closed so that seals 340 and 342 suspend sheet 212 while the molten gasket material is injected into mold cavity 218 through the cold runner system 325. While the molten gasket or casing material is injected in to the mold cavity, cooling water is pumped through the upper and lower mold sections through a series of cooling water passages 272, in a similar manner as described in reference to the previous embodiment. After the gasket or casing material is cured, the upper mold section 242 is raised off the lower mold section 222 and the ejector assemblies 290 provided in the upper mold sections urge the sheet of glass away from the upper mold section 242. The ejector assemblies 290 provided in the lower mold section 222 extend their rods 296 to support glass sheet 112 while suction cups 302 hold onto the glass sheet 112 until it can be removed by the operator.

Accordingly, the invention provides high pressure mold assemblies and methods useful in making modular window assemblies and other products with a gasket, casing or other molded portion extending around the periphery of the sheet material without breakage or fracturing the sheet material held therein. The invention allows a sheet of glass to be suspended in the mold assembly while the periphery of the sheet is molded with a gasket, casing or molded material, which is injected under high pressure, typically in the range of approximately 2000 psi to 5000 psi. The mold assembly also controls the "flash" or overflow of the gasket material.

While some forms of the invention have been shown and described, other forms will now be apparent to those skilled in the art. Therefore, it will be understood that the embodiment shown in the drawing and described above are merely for illustrative purposes, are not intended to limit the scope of the invention which is defined by the claims which follow at the end of the description.

We claim:

1. A high pressure mold assembly for molding a moldable material on a section of a sheet of rigid material, the sheet of rigid material having a portion extending into a mold cavity of said high pressure mold assembly into which molten moldable material is injected under high pressure, said high pressure mold assembly comprising:

first and second mold sections having first and second facing surfaces respectively and defining a mold cavity therebetween, said second mold section including a movable pressure pad supported thereon, said pressure pad defining said second facing surface;

one of said first and second facing surfaces defining a first seal receiving surface extending along and adjacent said mold cavity, said first seal receiving surface having a first groove recessed therein, said first groove being spaced from said mold cavity by a shoulder such that said first seal is protected from the high pressure associated with the injection of the molten material; and a first resilient seal positioned in said first groove for pressing the sheet against the other of said first facing surface and said second facing surface with a sufficient force for holding the sheet while a molded gasket is molded on the portion of the sheet with the molten material introduced into said mold cavity under high pressure and for absorbing dimensional variations in the sheet, said seal adapted to press and seal against the sheet for preventing the flow of the molten material therepast along the sheet when introduced in said mold cavity under high pressure exceeding about 2000 psi.

2. A high pressure mold assembly according to claim 1, wherein said first facing surface defines said first seal receiving surface.

3. A high pressure mold assembly according to claim 2, said second facing surface including a second seal receiving surface, said second seal receiving surface including a second groove formed therein, and said mold assembly further comprising a second resilient seal positioned in said second groove, said first and second seals engaging the sheet therebetween with a sufficient force for holding the sheet while a molded gasket is molded on the portion of the sheet with the molten material introduced into said mold cavity under high pressure and absorbing dimensional variations in the sheet, said second seal adapted to press and seal against the sheet for preventing the flow of the molten material therepast along the sheet when introduced in said mold cavity under high pressure exceeding about 2000 psi.

4. A high pressure mold assembly according to claim 3, further comprising a shoulder between said mold cavity and said groove on each of said first and second seal receiving surfaces, said shoulders protecting said seals and resisting pressure when the molten material is introduced under high pressure.

5. A high pressure mold assembly according to claim 4, each of said shoulders having a generally planar surface for facing the sheet of material.

6. A high pressure mold assembly according to claim 5, said planar surfaces extend generally parallel to a first surface and a second surface of the sheet when received in said mold assembly and for defining a first gap between said first mold section and the first surface of the sheet and a second gap between the second mold section and the second surface of the sheet.

7. A high pressure mold assembly according to claim 6, wherein said first gap is in the range of approximately 0.001 inches to 0.015 inches.

8. A high pressure mold assembly according to claim 7, wherein said second gap is in the range of approximately 0.001 inches to 0.015 inches.

9. A high pressure mold assembly according to claim 4, each of said seals having a generally planar surface for facing the sheet of material, said planar surfaces of said seals adapted to extend generally parallel to the first and second surfaces of the sheet.

10. A high pressure mold assembly according to claim 9, each of said seals having an axis of symmetry, said axes of symmetry extending generally perpendicular to the respective first and second surfaces of the sheet.

11. A high pressure mold assembly according to claim 1, said first seal having a generally planar surface for facing the sheet, said planar surface of said seal adapted to extend generally parallel to a contact surface of the sheet.

12. A high pressure mold assembly according to claim 11, said first seal having an axis of symmetry, said axis of symmetry extending generally perpendicular to the contact surface of the sheet.

13. A high pressure mold assembly according to claim 1, wherein each of said first seal receiving surface and said second facing surface have a generally planar surface for facing the sheet of material, said planar surfaces extending generally parallel to a first surface and a second surface of the sheet, and said planar surface of said first sealing surface being adapted to define a first gap between said planar surface of said first seal receiving surface and the first surface of the sheet when the sheet is received in said mold assembly.

14. A high pressure mold assembly according to claim 13, wherein said first gap is in the range of approximately 0.001 inches to 0.015 inches.

15. A high pressure mold assembly according to claim 14, wherein said second facing surface includes a second seal receiving surface, said second seal receiving surface including a second groove, said mold assembly including a second seal positioned in said second groove, said first and second seals for engaging the sheet therebetween for holding the sheet, said first and second seals being adapted to press and seal against the sheet for preventing the flow of molten material therepast along the sheet when introduced into said cavity under a high pressure exceeding 2,000 psi, said planar surface of said second facing surface being adapted to define a second gap between said planar surface of said second facing surface and the second surface of the sheet when the sheet is received in said mold assembly and said second gap being in a range of approximately 0.001 inches to 0.015 inches.

16. A high pressure mold assembly according to claim 15, wherein each of said seals project from said first and second seal receiving surfaces, respectively, at a distance in a range of approximately 0.005 to 0.01 inches.

17. A high pressure mold assembly according to claim 3, wherein said seals are selected from the materials in the group consisting of urethane, polyethylene terephthalate, and silicone rubber.

18. A high pressure mold assembly according to claim 1, including at least one injection gate adapted to inject molten moldable material into said mold cavity, said injection gate and mold cavity adapted to receive the moldable material at a high pressure of between about 2000 and 5000 psi.

19. A high pressure mold assembly according to claim 17 including a plurality of injection gates communicating with said mold cavity at positions spaced along said mold cavity.

20. A high pressure mold assembly according to claim 1, further including at least one ejection member for ejecting the sheet with the moldable material formed thereon from at least one of said mold sections after molding.

21. A high pressure mold assembly according to claim 20, wherein said ejection member includes a vacuum holding cup for holding the sheet in position during molding.

22. A high pressure mold assembly for molding a moldable material injected under high pressure on a portion of a glass sheet, said high pressure molding assembly comprising:

first and second mold sections having facing surfaces and defining a mold cavity therebetween, said first mold section defining a first seal receiving surface extending along and adjacent said mold cavity;

said second mold section having a moveable pad supported thereon, said moveable pad having a second seal receiving surface extending along and adjacent said mold cavity and opposing said first seal receiving surface of said first mold;

at least one resilient member urging said moveable pad toward said first mold section; and a pair of seals, one seal recessed in said first seal receiving surface and one seal recessed in said second seal receiving surface, said first and second seals being spaced from said mold cavity by shoulders, said shoulders protecting said first and second seals from said high pressure, said seals engaging and holding the glass sheet therebetween while absorbing variations in the glass sheet when the glass sheet is in said mold assembly, said seals adapted to press and seal against the glass sheet for preventing flashing of the moldable material therepast when introduced into said mold cavity under high pressure of at least about 2000 psi.

23. A high pressure mold assembly according to claim 22, each of said seals having a generally planar surface for facing the glass sheet, a first of said planar surfaces adapted to extend generally parallel to a first contact surface of the glass sheet and a second of said planar surfaces adapted to extend generally parallel to a second opposed contact surface of the glass sheet.

24. A high pressure mold apparatus according to claim 23, wherein each of said seals is positioned to extend generally perpendicular to the glass sheet.

25. A high pressure mold assembly according to claim 23, each of said seals having an axis of symmetry, said axis of symmetry adapted to extend generally perpendicular to the respective surfaces of the sheet of material.

26. A high pressure mold apparatus according to claim 22, wherein each of said seals is positioned to extend generally perpendicular to the glass sheet.

27. A high pressure mold apparatus according to claim 22, wherein said moveable pad includes a shoulder interposed between said seal on said second seal receiving surface and said mold cavity to protect said seal on said second seal receiving surface from high pressure associated with the injection of the moldable material into the mold cavity.

28. A high pressure mold assembly according to claim 22, wherein each of said seals is spaced apart from said mold cavity defining shoulders, said shoulders protecting said seals from the high pressure associated with the injection of the moldable material into the mold cavity.

29. A high pressure mold assembly according to claim 28, each of said first and second seal receiving surfaces having a generally planar surface intermediate said respective seal and said mold cavity for facing the glass sheet, said planar surfaces adapted to extend generally parallel to a first contact surface and a second opposed contact surface of the glass sheet when the sheet is received in said mold assembly and adapted to define a first gap between said first seal receiving surface and the first contact surface of the glass sheet and a second gap between the second seal receiving surface and the second contact surface of the glass sheet.

30. A high pressure mold assembly according to claim 29, wherein said first gap is in the range of approximately 0.001 inches to 0.015 inches.

31. A high pressure mold assembly according to claim 29, wherein said second gap is in the range of approximately 0.001 inches to 0.015 inches.

32. A high pressure mold assembly according to claim 29, wherein each of said seals projects from said first and second seal receiving surfaces, respectively, a distance within the range of approximately 0.005 inches to 0.01 inches.

33. A high pressure mold assembly according to claim 22, wherein said seals are selected from the materials in the group consisting of urethane, polyethylene terephthalate, and silicone rubber.

34. A high pressure mold apparatus according to claim 22, wherein one of said seals is selected from material in the group consisting of urethane and silicone rubber, and the other of said seals comprises a polyethylene terephthalate seal.

35. A high pressure mold assembly according to claim 22, wherein said first seal receiving surface and said second seal receiving surface each include a groove formed therein for receiving said seals.

36. A high pressure mold assembly according to claim 35, each of first and second seal receiving surfaces have a generally planar surface intermediate said respective groove and said mold cavity for facing the sheet of material, said planar surfaces adapted to extend generally parallel to a first surface and a second surface of the glass sheet of material and to define a first gap between said first seal receiving surface and the first surface of the sheet and a second gap between the second seal receiving surface and the second surface of the glass sheet.

37. A high pressure mold assembly according to claim 36, wherein said first gap is in the range of approximately 0.001 inches to 0.015 inches.

38. A high pressure mold assembly according to claim 37, wherein said second gap is in the range of approximately 0.001 inches to 0.015 inches.

39. A high pressure mold assembly according to claim 35, wherein each of said grooves in said first seal receiving surface and said second seal receiving surface is generally symmetrical about an axis, said axes adapted to extend generally perpendicularly to respective contact surfaces of the glass sheet when the glass sheet is received in said mold assembly.

40. A high pressure molding assembly according to claim 35, wherein said grooves each comprise a generally rectangular cavity, said cavity including spaced apart sides, said sides extending generally parallel to each other.

41. A high pressure mold assembly according to claim 40, wherein said each of said seals is generally symmetrical about an axis, each of said axes extending generally parallel with said spaced apart sides of a respective mold cavity.

42. A high pressure molding assembly according to claim 22, wherein each of said seals includes a generally geometric shape, said geometric shapes having relatively constant cross sections for extending along an axis generally perpendicular to a respective contact surface of the glass sheet.

43. A high pressure mold assembly according to claim 1, wherein said shoulder has a width between said mold cavity and said first groove, said width being in a range of about 0.08 inches to about 0.135 inches.

44. A high pressure mold assembly according to claim 1, wherein said second facing surface defines said first seal receiving surface.

45. A high pressure mold assembly according to claim 35, wherein at least one of said grooves is spaced from said mold cavity to define a shoulder therebetween, said shoulder protecting a respective one of said seals from the high pressure associated with the injection of the molten material.

* * * * *

UNITED STATES PATENT AND TRADEMARK OFFICE
CERTIFICATE OF CORRECTION

PATENT NO. : 5,916,600
DATED : June 29, 1999
INVENTOR(S) : Dubay et al

It is certified that error appears in the above-identified patent and that said Letters Patent is hereby corrected as shown below:

Column 16, line 43, change "extend" to --extending--.

Signed and Sealed this

Fourteenth Day of September, 1999

Attest:

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO.   : 5,916,600
DATED        : June 29, 1999
INVENTORS    : Dubay et al.

It is certified that error appears in the above-identified patent and that said Letters Patent is hereby corrected as shown below:

Column 10, line 22:

Please delete the "." after "136a" and insert in lieu thereof --,--.

Column 13, line 44:

Please delete "Glass" before "sheet 212," and insert in lieu thereof --glass--.

Signed and Sealed this

Fourth Day of April, 2000

*Attest:*

Q. TODD DICKINSON

*Attesting Officer*  *Director of Patents and Trademarks*